United States Patent [19]

Shaughnessy et al.

[11] 3,976,140

[45] Aug. 24, 1976

[54] METHOD OF CONSOLIDATING SUBTERRANEAN FORMATIONS USING DILUTED RESINS

[75] Inventors: Christopher M. Shaughnessy; William M. Salathiel, both of Houston, Tex.

[73] Assignee: Exxon Production Research Company, Houston, Tex.

[22] Filed: June 23, 1975

[21] Appl. No.: 589,163

[52] U.S. Cl. .............................................. 166/295
[51] Int. Cl.² ...................................... E21B 33/138
[58] Field of Search .................................... 166/295

[56] References Cited
UNITED STATES PATENTS

| | | | |
|---|---|---|---|
| 3,176,768 | 4/1965 | Brandt et al. | 166/295 |
| 3,297,089 | 1/1967 | Spain | 166/295 |
| 3,305,017 | 2/1967 | Dollarhide | 166/295 |
| 3,339,633 | 9/1967 | Richardson | 166/295 |
| 3,587,742 | 6/1971 | Wittenwyler | 166/295 |
| 3,612,181 | 10/1971 | Brooks, Jr. | 166/295 |
| 3,760,880 | 9/1973 | Dollarhide | 166/295 X |
| 3,857,444 | 12/1974 | Copeland | 166/295 X |

*Primary Examiner*—Stephen J. Novosad
*Assistant Examiner*—George A. Suckfield
*Attorney, Agent, or Firm*—Robert L. Graham; Salvatore J. Casamassima

[57] ABSTRACT

A method of consolidating incompetent subterranean formation surrounding a well wherein a liquid resin diluted with a two-part diluent is injected into the formation and is followed by an overflush liquid to extract the diluent but leave the resin on the sand grains. The two-part diluent comprises a first component miscible with the resin and a second component immiscible with the resin but miscible with the first component and the overflush liquid.

20 Claims, No Drawings

METHOD OF CONSOLIDATING SUBTERRANEAN FORMATIONS USING DILUTED RESINS

BACKGROUND OF THE INVENTION

1. Field of the Invention

This invention relates to a method for consolidating subterranean formations using diluted resin and overflush oils to extract the resin diluent. In one aspect, it relates to the use of an improved diluent for resins used in such operations.

2. Description of the Prior Art

The use of resins as a sand control means in oil wells, gas wells, water wells, and similar boreholes has long been employed. The plastic consolidation treatments, as they are commonly called, involve the injection of a liquid resin into the formation and thereafter causing the resin to cure to an infusible state. The resin cements the sand grains together forming a permeable consolidated sheath around the wellbore. In order to be successful, the consolidation treatment must not only provide a high strength in the consolidated interval, but must retain a high percentage of formation permeability through which the produced fluid can flow.

In certain types of treatments, adequate permeability can be achieved only by the use of an overflush liquid which functions to remove resin from the pore space.

Opposing mechanisms are involved in the overflushing process: resin must be removed to provide permeability but sufficient resin must be left on the sand grains to provide adequate consolidation strength. An improper balance of these two conditions will result in the failure of the consolidation treatment.

The problem of achieving the proper balance of permeability and strength in the treated interval when an oil overflush is used is even more difficult in resins which employ diluents. These resins, exemplified by expoxy resins, are available only as viscous liquids or solids. In order to handle and inject these resins into the formation, they must be diluted with a suitable diluent. Moreover, since the sequential injection of the treating fluids normally exhibits a progressively increasing viscosity (in the order of injection) to provide favorable mobility ratios, high resin viscosities will result in even higher viscosities of the following liquids and, consequently, still more difficulty injecting the required overflush oil.

With diluted resins, the overflushing liquid must selectively extract the diluent from the resin. If substantial amounts of the diluent are left in the resin, the resin, upon curing, will not attain sufficient compressive strength for the purposes of sand consolidation treatments. Thus, merely displacing the diluted resin from pore space to provide permeability is wholly unsatisfactory.

It might be thought that an effective single component resin diluent could be thoroughly extracted from the resin by simply overflushing with a larger quantity of overflush oil. However, this practice has shortcomings. Laboratory tests have shown that the use of large amounts of the overflush oil will adversely affect compressive strength of the consolidated interval. Large amounts of the soluble diluent render the resin slightly soluble in the overflush liquid. Thus, large amounts of overflush oil will, either by erosion or by dissolution, remove substantial amounts of resin from the sand grains, with the result that there is insufficient resin left on the sand grains to provide a high strength consolidated interval.

In summary, the resin diluent must simultaneously be effective in reducing resin viscosity and be easily extractable by the overflush liquid. Unfortunately, resin diluents that have been used in the past either exhibit good viscosity reduction properties or good extractability by the overflush liquid, but not both of these important properties.

An example of one common diluent used with epoxy resins is ethyl acetate (See "Consolidation of Silty Sands with an Epoxy Resin Overflush Process" by E. H. Richardson et al., published in *Journal of Petroleum Technology*, September, 1970.) This diluent is readily extractable by the overflush oil but it is only moderately effective in reducing the viscosity of a liquid epoxy resin. Relatively large amounts of ethyl acetate are required to reduce the resin viscosity sufficiently to permit easy injection into the formation. High dilutions result in lower resin retention and, therefore, lower strength.

Another diluent commonly used with epoxy resins is acetone (see U.S. Pat. No. 3,612,181). Acetone is more effective in reducing resin viscosity than is ethyl acetate, but unfortunately it is not easily extracted by the overflush oil. In order to permit removal of substantial amounts of acetone by the extraction process, its concentration is normally limited to about fifteen weight percent in the resin solution. This reduces the resin viscosity to only about 90 centipoises, which, as noted above, is unsuitable for many treatments.

Reactive diluents such as propylene oxide, styrene oxide, octylene oxide, and the like have also been proposed for use with epoxy resins (see U.S. Pat. No. 3,176,768). Except for propylene oxide, most of the reactive diluents are not particularly effective in reducing resin viscosity. Propylene oxide, while an effective viscosity reducer, is extremely hazardous to use because it is known to react spontaneously with many common chemicals such as copper or brass to form explosive acetylides.

Plastic sand consolidation treatments which rely on the use of dilute resins and diluent extractants have been widely used over the years and have proven satisfactory as a sand control technique. However, it is believed that they have not realized their full potential in developing long life and highly permeable consolidations. It is believed that one of the major problems with these systems is due to the type of diluents commonly employed.

SUMMARY OF THE INVENTION

The plastic sand consolidation method of the present invention employs an improved resin diluent that not only exhibits good viscosity reduction but also is readily extractable by the overflush liquid. Briefly, the invention contemplates the sequential injection into a subterranean formation of a resin solution which contains a two-part diluent followed by the injection of a diluent extracting pore opening liquid (i.e. overflush liquid). The two-part diluent comprises a first component miscible with the resin and a second component immiscible with the resin but miscible with the first component and the overflush liquid.

The two-part diluent is particularly suitable for use in processes which employ epoxy resins, since almost all of these systems use diluents to reduce the viscosity to satisfactory levels. Such systems thus require the diluent to be extracted following placement of the resin solution in the formation.

The concentration of the diluent in the resin should be sufficient to provide the final resin solution with a viscosity of not more than about 30 centipoises at about 72°F, and preferably not more than 20 centipoises at about 72°F. The concentration of the two-part diluent in the resin will normally be between about 10 to 40 weight percent to achieve the desired level of viscosity reduction. Laboratory tests have shown that the two components of the diluent may be used in various weight ratios ranging from about 1:1 to about 9:1 (resin miscible:resin immiscible). The preferred weight ratio is from about 1.5:1 to about 4:1. In order to enhance diluent miscibility with the resin, the miscible component preferably constitutes the major weight proportion of the diluent and is present in the resin solution at a concentration not in excess of about 25 weight percent.

The miscible component of the diluent may be those diluents commonly used for resins. For epoxy resins, usable miscible components include acetone, ethyl acetate, ethylene glycol monobutyl ether, dibutyl phthalate, monomeric styrene, and reactive diluents such as propylene oxide, phenyl glycidyl ether, phenolic diluents, and the like.

The immiscible component may include low molecular weight non-aromatic hydrocarbon liquids. Suitable hydrocarbon liquids include $C_4$–$C_{12}$ alkanes and alkenes, and $C_5$–$C_{12}$ cycloalkanes and cycloalkenes, and the like. Such materials are not readily miscible with the resin but are miscible with both the typical resin-miscible diluents and the overflush oil. Also usable are middle distillates of refined petroleum which include kerosene, gas oil, diesel fuels, and the like.

The overflush liquid is normally an oil substantially free of aromatics and olefins. White oils, technical and industrial grades, are frequently used as an overflush liquid because these oils are substantially immiscible with resins and at least partially miscible with most diluents. In order to enhance diluent extraction, the overflush oil should be miscible with the resin-immiscible component and with at least 5% concentration of resin-miscible component.

Laboratory tests have shown that the use of the two-part diluent in exposy resins not only provides adequate viscosity reduction but also improves the strength of the consolidated interval. The reasons for the improvement are not fully understood but are believed due to the ease with which substantial amounts of the diluent are extracted from the resin solution.

The present invention is described in detail below with particular emphasis on the epoxy resin systems. Again, it should be observed that the principles exemplified by the invention are equally applicable to other resin systems that employ a resin solution and diluent extractant in consolidation of incompetent subterranean formations.

DESCRIPTION OF THE PREFERRED EMBODIMENTS

The two-part diluent comprising a resin-miscible component and a resin-immiscible component may be blended before mixing with the resin or the immiscible component may be added to the resin diluted with the miscible component. In either technique for preparing the resin solution, the two-part diluent is miscible with the resin and effectively reduces its viscosity to usable levels.

The total concentration of the diluent in the resin should provide a sufficiently low viscosity to permit injection into the formation without risking fracturing the formation. Low viscosity also favors wetting of the sand grains and capillary flow in the pore spaces. Tests have shown that viscosities of about 30 centipoises or less at 72°F are satisfactory. Ideally, however, the resin solution should have a viscosity of about 20 centipoises or less at 72°F. The low viscosity not only enables the resin to uniformly invade the interval to be treated, it also aids in the handling procedures. Normally the resin is injected through a tubing string and into the formation. Highly viscous liquids tend to stick to the interior of the tubing and are not easily removed by trailing liquids. In the treatments which employ separate solutions for carrying the resin and the curing agent to the formation, premature mixing of the curing agent with the resin coating on the pipe can produce a partially polymerized resin that tends to plug the wellbore perforations and prevent uniform distribution of the catalyst solution.

The present invention is particularly applicable in epoxy resin systems. Epoxy resins useful for the purpose of this invention include the diglycidyl ethers of bisphenol-A [bis(4-hydroxy phenyl) dimethyl methane] obtained by the reaction of epichlorohydrin (1-chloro-2,3 epoxy propane) and bisphenol-A in the presence of an alkali such as sodium hydroxide or potassium hydroxide. Similarly, a diglycidyl ether of bisphenol-F can be prepared by reacting epichlorohydrin with bisphenol-F [bis(4-hydroxy phenyl) methane]. A mononuclear di-or tri-hydroxy phenol such as resorcinol, hydroquinone, pyrocatechol, or phloroglucinol or a polynuclear polyhydroxy phenol such as 4,4-dihydroxy biphenyl will produce an epoxy resin when reacted with a halohydrin such as 1,2-dichloro-3-hydroxy propane or dychlorohydrin. Still other satisfactory materials include the novolac epoxy resins prepared by the condensation of a polynuclear phenol with epichlorohydrin.

The epoxy resins are cured by curing agents (e.g. hardeners, activators, or catalysts). Usable curing agents are discussed at length in the literature. Frequently employed curing agents include primary and secondary amines such as m-phenylenediamine, diethylene triamine, and the like. Also usable are organic acids and acid anhydrides such as oxalic acid, phthalic anhydride, and the like. Tertiary amines such as tri(-dimethylaminomethyl)phenol and Lewis acids such as boron trifluoride may also be used as curing agents.

The epoxy resins may be applied by an internally-cured method wherein a mixture of the resin and the two-part diluent along with the curing agent is injected into the formation. An overflush liquid is then used to displace the resin into the formation in order to impart the desired permeability to the invaded pore spaces and to extract the diluent. The internally-cured epoxy system is described at length in "Consolidation of Silty Sands with an Epoxy Resin Overflush Process" supra.

Alternatively, the epoxy resins may be placed by an in-situ-cured method wherein the resin dissolved in the two-part diluent is injected into the formation followed by the curing agent dissolved in the overflush liquid. The overflush liquid displaces the resin into the formation and imparts the desired permeability to the invaded pore spaces. The curing agent is extracted by the resin in contact with the sand grains. This causes the resin to harden, bonding the sand grains together. An in-situ-cured epoxy treatment is described in "Externally Catalyzed Epoxy for Sand Control" by F. A. Brooks et al., published in *Journal of Petroleum Technology*, June, 1974.

As described in detail in the references noted above, the consolidation treatments, in addition to the resin solution and overflush liquids, may employ other liquids such as pre-acidizing treatments, preflush solvents, spacer liquids, and the like. Additives for the various solutions may include silane coupling agents, thickening agents, surfactants, and the like.

LABORATORY EXPERIMENTS

The following laboratory experiments were performed to determine the ability of various diluents to be extracted from the resin solution by contact with a typical overflush oil. The following three solutions were prepared:

SOLUTION A 480 grams of bisphenol-F resin having an epoxy equivalent weight of 165 grams per epoxide was mixed with 120 grams of acetone. The bisphenol-F resin used in the experiment was a product of Dow Chemical Company sold as Resin XD-7818.

SOLUTION B 480 grams of the bisphenol-F resin was mixed with 120 grams of propylene oxide (a reactive diluent).

SOLUTION C 480 grams of the bisphenol-F resins was mixed with 120 grams of a two-part diluent comprising 90 grams of acetone (miscible component) and 30 grams of cyclohexane (immiscible component).

The following tests were performed on each of the three solutions: (a) 100 milliliter sample of each resin solution was mixed with 100 milliliters of an overflush oil which in these tests was a mixture of two substantially aromatic-free and olefin-free refined oils sold by Exxon Company, U.S.A. as Mentor 28 and Flexon 766. (b) The resin solution and overflush oil were permitted to equilibrate at about 72°F for about 90 minutes, the lighter overflush oil rising to the top of the beaker. (c) the resin solution was drained off and its viscosity measured at about 72°F. (d) A second 100 ml sample of the resin solution was added to the same overflush oil and the mixing, withdrawal of resin solution, and viscosity measurement of the resin solution were repeated. This process was performed for four separate 100 milliliter samples of each resin solution. The purpose of the test was to determine the cumulative effect of the overflush oil in extracting diluent from fresh samples of the resin solution. If the diluent exhibited limited solubility in the overflush oil, the overflush oil would soon become saturated such that the addition of fresh samples of resin solution would be unaffected when mixed with the overflush oil. This would be reflected by no change in the viscosity of the resin solution before and after contact with the overflush oil. Table I presents the results of these tests.

TABLE I

| Resin Solution | Viscosity, cp at 72°F | | |
|---|---|---|---|
| | Solution A | Solution B | Solution C |
| before mixing | 12.9 | 14.0 | 16.3 |
| Number of Mixings | | | |
| 1 | 19.5 | 37.6 | 37.9 |
| 2 | 14.1 | 19.9 | 25.3 |
| 3 | 13.5 | 16.3 | 23.4 |
| 4 | 12.9 | 15.2 | 21.6 |

From Table I, it can be seen that the diluent satisfactorily reduced the viscosity of each resin solution to less than 20 centipoises at 72°F. The data also show that acetone (Solution A) was extracted to only a limited extent by the overflush oil. The 100 milliliters of overflush oil became almost fully saturated after contact with only the initial 100 milliliter samples of Solution A. With the propylene oxide diluent, two samples (200 ml) of Solution B were required to saturate 100 ml of overflush oil. The two-part diluent was far more extractable than the other diluents. Note that even after the 100 milliliters of overflush oil contacted 400 milliliters (all four mixings) of Solution C, it still was capable of extracting diluent as reflected by the increase in viscosity from 16.3 to 21.6 centipoises.

In order to demonstrate the effect of the treatment according to the present invention on the compressive strength of the consolidated interval, several consolidated samples were prepared and subjected to compressive strength tests. Five and samples consisting of about 2200 grams of Brazos River sand were packed in rubber tubes 1½ inches in diameter and 48 inches long. The packed tubes were inserted into steel cells and subjected to a confining pressure of 1500 psi. Each sample was evacuated, saturated with brine, flooded with number 2 diesel fuel, and then flushed to residual oil saturation with 500 cc of brine. The temperature of the test apparatus was maintained at about 180°F and internal fluid pressure was maintained at about 1000 psi.

Each sample was consolidated by the sequential injection of the following fluids:
a. Preflush liquid: 200 ml of ethylene glycol isopropyl ether containing 0.5 weight percent of polyvinylpyrrolidone sold by GAR Corporation as PVP Type K90;
b. Resin Solution: 250 ml of a mixture containing 74.5 weight percent of a bisphenol-F resin sold by Dow Chemical Company as XD-7818, 25 weight percent of a diluent, and 0.5 weight percent of a silane coupling agent sold by Dow Corning as Z-6020; and
c. Overflushing Oil: 1200 ml of a mixture containing two refined oils sold by Exxon Company, U.S.A. as Flexon 766 (400 ml) and Mentor 28 (800 ml) containing 3 weight percent of tri(dimethylaminomethyl)phenol, a tertiary amine catalyst sold by Rohm and Haas as DMP-30.

Following injection of the various solutions, each sand sample was permitted to cure for about 18 hours. The only difference in the treatments described above was in the type of diluent used in the epoxy solutions. In each of the resin solutions, the diluent concentration was 25 weight percent based on the total weight of the solution. The diluents used in the five treatments were (1) acetone; (2) propylene oxide; (3) three parts acetone and two parts cyclohexane; (4) three parts acetone and one part cyclohexane; (5) three parts acetone, and one part pentane. The ratios specified in samples 3, 4, and 5 are weight ratios.

All of the treatments produced fully consolidated 48-inch long cores. The five cores were removed from the test apparatus and five representative samples were taken from corresponding locations in each core were subjected to compressive tests. Compressive loadings on the cylindrical samples 1½ inches in diameter and 2 inches in height were gradually increased until the sample cracked. Average compressive strength (at failure) for the five samples of each core are shown in Table II.

TABLE II

|  | Diluent Used in Resin Solution | Average Compressive Strength (psi) |
|---|---|---|
| Core 1 | Acetone | 3060 |
| Core 2 | propylene oxide | 3520 |
| Core 3 | 3 parts acetone, 2 parts cyclohexane | 5340 |
| Core 4 | 3 parts acetone, 1 part cyclohexane | 4510 |
| Core 5 | 3 parts acetone, 1 part pentane | 4700 |

The data in Table II clearly shows the superior results obtained with the two-part diluent. The data also show that the specific type of resin-immiscible component used in the diluent does not appear to be critical. Note the results with cyclohexane and pentane were comparable.

The reason for the improved results using the two-part diluent, which as mentioned above was the only difference in the treatment, is believed to be due to the improved extractability of the resin-immiscible components by the overflush oil. This component exhibits high solubility in the overflush oil, so that upon flowing through the core, the overflush oil extracts substantial amounts of the resin-immiscible component from the resin solution. The remaining resin on the sand grain is thus quickly transformed into a highly viscous liquid which further retards resin removal from the sand grains. The two-part diluent reduces the amount of miscible components required which in turn reduces the mutual solvency of the resin and overflush oil.

Moreover, the high solubility of the two-part diluent in the overflush oil reduces the amount of fluid that must be flowed past the resin on the sand grains, and thereby reduces resin removal by erosion or dissolution. It is believed that these are the mechanisms whereby the two-part diluents leave substantially more resin on the sand grains than do the other diluents.

FIELD PROCEDURE

The procedure and the specific materials used in performing plastic sand consolidation in accordance with the present invention can vary within wide ranges and will depend on several factors including type of formation, formation conditions, resins employed, and well equipment, to name but a few. One specific procedure for carrying out the invention using an in-situ-cured bisphenol-F epoxy resin system is described below.

In most treatments, it generally will be preferred to remove the producing tubing (if used) from the well and inserting a workstring for cleaning out the well and for conducting treating fluids to the formation. The workstring used preferably is a small diameter tubing having internal flush joints. Alternately, the fluids may be pumped through the production tubing in a "bullhead" pumping procedure. The various fluids used in the treatment are usually injected in the following sequence: (1) preflush solvent, (2) resin solution, (3) spacer oil, (4) catalyst solution. In some treatments, it is preferred to acidize the formation prior to the sand consolidation to prepare the interval for treatment. Typical acids include HF or mixtures of HF with mineral acids such as HCl. Wiper balls or plugs may also be employed in the spacer oil to insure complete separation of the catalyst solution and the resin solution. In a typical treatment, the pumping sequence, approximate volumes, and viscosities of an in-situ-cured epoxy treatment will be as follows:

TABLE III

|  | Example | Viscosity range (cps) at about 72°F | Volume (gal) Per Foot of Formation Thickness Treated |
|---|---|---|---|
| Preflush solvent: | Ethylene glycol isopropyl ether containing from 0.1 to 1.0 wt. % polyvinyl-pyrrolidone and 0.1 to 1.0 wt. % coupling agent (e.g. Z-6020) | 3 to 10 | 50 to 150 |
| Resin solution: | Epoxy sold by Dow Chemical Company as XD-7818 with from 20 to 30 wt. % two-part diluent (e.g. 3 parts acetone, one part cyclohexane) | 10 to 30 | 50 to 90 |
| Spacer oil: | Refined oil substantially aromatic-free and olefin-free (sold by Exxon Co., USA as Mentor 28 and Flexon 766) | 15 to 35 | 10 to 40 |
| Overflush Oil | Refined oil (sold by Exxon Co., USA as Mentor 28 and Flexon 766) and from 2 to 4 wt % curing agent (e.g. an amine sold by Rohm and Haas as DMP-30) | 15 to 35 | 250 to 400 |

The injection rate should be sufficiently low to prevent fracturing of the formation. As a general rule, the liquids are injected at a rate of from about 1 to 4 gallons per minute for each foot of formation consolidated.

Following the pumping of these liquids into the workstring, a displacing oil is normally pumped to insure that all of the overflush oil is injected into the formation. The well is then shut in for a period sufficient to permit the resin to cure to an infusible state which normally requires about 12 hours.

Again, it should be observed that the method of the present invention may advantageously be used in the internally-cured epoxy system, which, as mentioned above, relies on the use of diluents and the extraction of the diluents to achieve high strength consolidated intervals. Other systems, such as phenol-formaldehyde resin systems and furan resin systems, may also employ the two-part diluent. Of course, it will be realized that specific materials and procedures may differ somewhat from those described herein. However, the principle exemplified by the two-part diluent in providing low viscosities for the resins and exhibiting good extractability by the overflush oil are equally applicable to such systems.

We claim:

1. A method for the consolidation of an incompetent subterranean formation surrounding a well which comprises:
   a. injecting into said formation a liquid resin containing sufficient amounts of a diluent to reduce the resin viscosity to 30 centipoises or less at about 72°F, said diluent including substantial amounts of resin-miscible component and substantial amounts of a resin-immiscible component, said resin-miscible component and said resin-immiscible component being mutually miscible; and
   b. thereafter injecting a nonaromatic hydrocarbon liquid into said formation to extract diluent from the liquid resin, said liquid being substantially immiscible with said liquid resin, miscible with said resin-immiscible component, and at least partially miscible with said resin-miscible component.

2. A method as defined in claim 1 wherein the liquid resin is an epoxy resin.

3. A method as defined in claim 2 wherein the concentration of the diluent in the epoxy resin solution is between about 10 percent and 40 percent by weight.

4. A method as defined in claim 3 wherein the resin-miscible component is selected from the group consisting of ketones, esters, glycol ethers, glycidyl ethers, epoxides; and the resin-immiscible component is a nonaromatic hydrocarbon liquid having no more than about 12 carbon atoms per molecule.

5. A method as defined in claim 4 wherein the hydrocarbon liquid is a saturated hydrocarbon having from 4 to 12 hydrocarbon atoms per molecule.

6. A method as defined in claim 5 wherein the hydrocarbon liquid is a $C_5$ to $C_{12}$ alkane.

7. A method as defined in claim 5 wherein the saturated hydrocarbon is a cycloalkane having from 5 to 12 carbon atoms per molecule.

8. A method as defined in claim 4 wherein the hydrocarbon liquid is an unsaturated hydrocarbon.

9. A method as defined in claim 10 wherein the unsaturated hydrocarbon liquid is a cycloalkene.

10. A method as defined in claim 4 wherein the miscible component is a ketone.

11. A method as defined in claim 10 wherein the ketone is acetone.

12. A method as defined in claim 2 wherein the weight ratio of said resin-miscible component to said resin-immiscible component ranges from about 1:1 to about 9:1.

13. A method as defined in claim 1 wherein the hydrocarbon liquid contains a curing agent for said resin.

14. A method as defined in claim 1 wherein the liquid resin further includes a curing agent for said resin.

15. In a method for consolidating incompetent subterranean formations wherein a resin solution comprising a liquid resin and a diluent therefor is injected into the formation and thereafter an overflush liquid is injected to extract said diluent, the improvement wherein said diluent comprises a major weight proportion of a first component miscible with said resin and a minor weight proportion of a second component immiscible with said resin but miscible with said first component and said overflush liquid, and wherein the concentration of said diluent in the resin solution is sufficient to provide the resin solution with a viscosity of about 30 centipoises or less at about 72°F.

16. A method as defined in claim 15 wherein the resin is a liquid epoxy and the overflush liquid includes a curing agent for said epoxy resin.

17. A method as defined in claim 15 wherein the resin is a liquid epoxy and the resin solution further includes a curing agent for said epoxy resin.

18. A method as defined in claim 15 wherein the said diluent comprises from about 10 to about 40 weight percent of said resin solution and the weight ratio of said resin-miscible component to said resin-immiscible component ranges from about 4:1 to about 1.5:1.

19. A method as defined in claim 15 wherein the concentration of the resin miscible component in the resin solution is less than about 25 weight percent.

20. A method as defined in claim 15 wherein the concentration of the diluent in the resin solution is sufficient to provide the resin solution with a viscosity of not more than about 20 centipoises at about 72°F.

* * * * *